Figure 1:
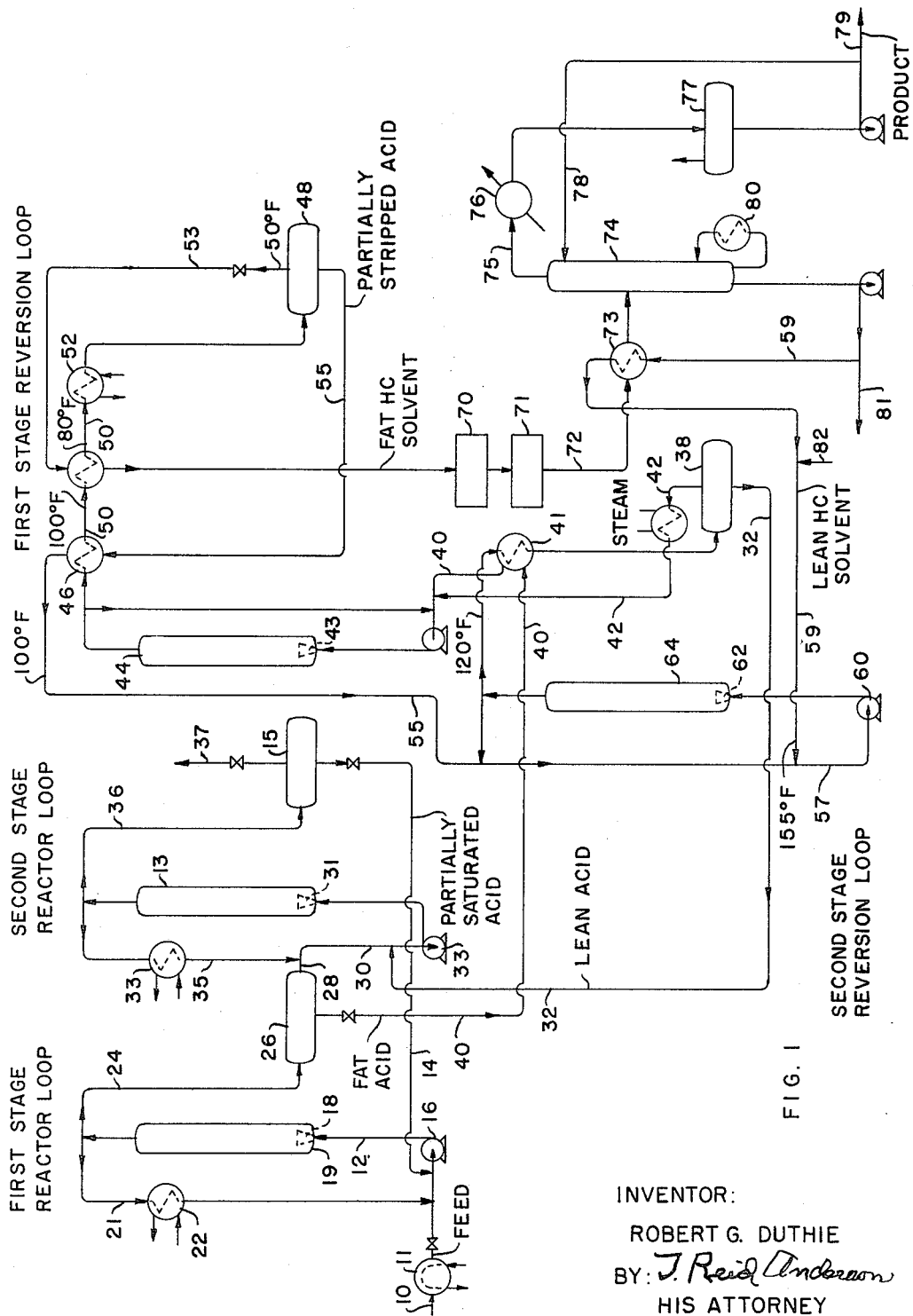

May 10, 1966     R. G. DUTHIE     3,250,820
TERTIARY AMYLENE CONCENTRATION
Filed April 15, 1959     2 Sheets-Sheet 1

INVENTOR:
ROBERT G. DUTHIE
BY: J. Reid Anderson
HIS ATTORNEY

INVENTOR:
ROBERT G. DUTHIE
BY: T. Reid Anderson
HIS ATTORNEY

3,250,820
TERTIARY AMYLENE CONCENTRATION
Robert G. Duthie, Pleasant Hill, Calif., assignor to Shell Development Company, New York, N.Y., a corporation of Delaware
Filed Apr. 15, 1959, Ser. No. 806,524
5 Claims. (Cl. 260—677)

This invention relates to a process for the separation and concentration of tertiary amylenes with a reduced amount of polymerization from a hydrocarbon stream containing that material along with other close boiling $C_5$ hydrocarbons, including normal amylenes.

Sulfuric acid has been widely used for the separation of various olefins from close boiling hydrocarbon mixtures, both in the manufacture of the alcohol corresponding to the separated olefin (this being achieved by hydration of the olefin in the acid), and in the recovery of the separated olefin as an end product from the fat acid, usually by steam stripping. However, the acid approach has not been widely used for the separation and recovery of the tertiary amylenes, most likely because of the tendency of the tertiary amylenes during the stripping of the fat acid, to form a tarry-like polymer leading to the fouling of equipment, and because of the high operating costs involved in the reconcentrating of the steam stripped acid to its extraction concentration. Tertiary amylenes compared to normal amylenes and secondary olefins generally, have a high activity and must be guardedly handled at high temperatures to avoid the formation of an objectionable amount of the polymer.

It has now been discovered that sulfuric acid may be advantageously utilized in the separation and recovery of such a highly active material as tertiary amylenes without the occurrence of an objectionable amount of polymerization. Fortuitously, it has developed that the equilibrium distribution (the K-value) of tertiary amylenes between an inert hydrocarbon solvent (such as hexane or octane) and sulfuric acid changes drastically with a moderate change in temperature. For example, the K-value for the mixed phases of hexane and sulfuric acid (65% concentration) varies from less than 1 at 32° F. to more than 4 at 120° F. At 104° F. and 140° F. the K-values are, respectively, approximately 3 and 6. Likewise, the rate of reversion of tertiary amyl alcohol (the principal form in which the t-amylenes are held in the acid) to the olefin is greatly increased with a rise in temperature. The existence of these favorable distribution coefficients at the elevated temperatures permit the stripping of the fat sulfuric acid phase with an inert hydrocarbon stream at a reversion temperature in the elevated range even though polymerization is favored by the high temperature operation (a) provided there is an intense mixing of the hydrocarbon-acid phases to facilitate the mass transfer of the liberated amylenes into the hydrocarbon phase and (b) provided the time of contacting of the mixed phases is held to a minimum to avoid an objectionable amount of polymerization. The use of aqeous sulfuric acids of too high acid concentrations is avoided in the process because the higher concentrated acids extract too much of the normal amylenes and promote excessive polymerization of the tertiary amylenes during the stripping thereof from the sulfuric acid. The presence of the normal amylenes in the tertiary amylene product is generally considered undesirable when this product is used as feed for dehydrogenation to produce isoprene since the normal amylenes produce piperylene, an undesirable material in isoprene which is to be polymerized to cis-polyisoprene.

In the process of the invention, a hydrocarbon feed stream containing tertiary amylenes and other close boiling $C_5$ hydrocarbons including normal amylenes is contacted with an aqueous sulfuric acid of an acid concentration in the range of 40% to 70% at a temperature in the range of 14° F. to 68° F. to extract selectively tertiary amylenes to the substantial exclusion of normal amylenes. The resulting fat sulfuric acid contains the tertiary amylenes principally as tertiary amyl alcohols. Following the separation of the fat sulfuric acid from the remaining feed stream the fat acid is intimately contacted at a temperature in the range of 104° F. to 120° F. with a liquid inert hydrocarbon stripping stream. The period of contacting is held to less than five minutes, to avoid excessive polymerization of the tertiary amylenes. For a contacting temperature of 120° F. a desirable contacting time is in the range of 1 to 3 minutes. The inert hydrocarbon and sulfur acid stream (following the intense mixing) is passed to a separation zone where the lean acid is phase separated from the now fat inert hydrocarbon. The residence time in the separation zone is not considered as a portion of the period of contacting of the acid and hydrocarbon phases.

To reduce further polymerization, it is recommended that the intimately mixed acid-inert hydrocarbon phases be cooled to a temperature below preferably 85° F. before the two phases are separated in the settling zone. This practice is particularly advantageous where the tertiary amylenes are recovered from the fat acid in a two-stage reversion-stripping procedure, for here a significant amount of the tertiary amylenes remain in the acid phase of the settling zone of the first stage and are subject to polymerization if the temperature of the separation zone remains too high. In a two stage operation the lean inert hydrocarbon stream (free of tertiary amylenes) is introduced first to the second stage and the resulting partially amylene fat inert hydrocarbon stream is then passed to the first stage as the stripping stream for that stage.

In an alternative embodiment, a rotary disc contactor may be employed for the reversion-stripping step of the process with the fat sulfuric acid and the inert hydrocarbon stripping stream entering at the opposite ends of the contactor. Several vapor streams of the inert hydrocarbon stripping material are introduced to the contactor at spaced distances along its length to assist in the maintenance of the desired operating temperature. In addition to the rotary disc contactor, other low residence time, highly agitated, countercurrent contacting devices may be employed, e.g., Podbelniak extractors, paddle mixer columns. Contactors lacking agitating means will not afford the intense mixing required for the successful reversion-stripping of the tertiary amylenes from the fat acid.

The recommended acid to feed ratio is in the range of 1 to 6 pounds of aqueous acid per pound of tertiary amylene in the feed with a preferred ratio of 3.2 pounds per pound. The phase ratio is such that the hydrocarbon phase is continuous and the acid phase is dispersed. The inert hydrocarbon solvent is generally used in the range of 2 to 8 pounds of solvent per pound of t-amylene in the feed, with the preferred ratio being 4.0 pounds per pound in the instance of hexane. The preferred ratio is sufficient to recover 95% of the absorbed amylenes in a two-stage countercurrent operation.

The inert hydrocarbon solvent for stripping of the fat acid may be either aromatic or paraffinic and either lower or higher boiling than the tertiary amylenes, but preferably higher boiling. The differences in boiling points should be of an amount sufficient to permit ready fractionation of the tertiary amylenes therefrom. A difference in boiling points of at least 15° F. is preferred. Hexane or octane are particularly suitable materials. The liquid polymer inadvertently formed in the process may be used at least in part as the inert hydrocarbon stripping material.

A preferred source of tertiary amylenes is a catalytically cracked C$_5$ fraction. Such a fraction will contain various normal amylenes along with the desired branched amylenes (isoprene precursors) of 3-methyl butene-1,3-methyl butene-2, and 2-methyl butene-1. In excluding substantially all of the normal amylenes from the desired material in a sulfuric acid extraction with say 67% acid, most of the 3-methyl butene-1 will be lost with the normal amylene. The concentration of the acid employed is in the range of 40 to 70%, and preferably in the range of 63 to 68%. Acid concentrations in excess of 70% are to be avoided since a too high concentrated acid tends to absorb too much of the secondary olefin (the normal amylenes) and because the high concentrated acids cause excessive polymerization at the high temperatures employed for the reversion-stripping of the fat acid.

Figure 2:
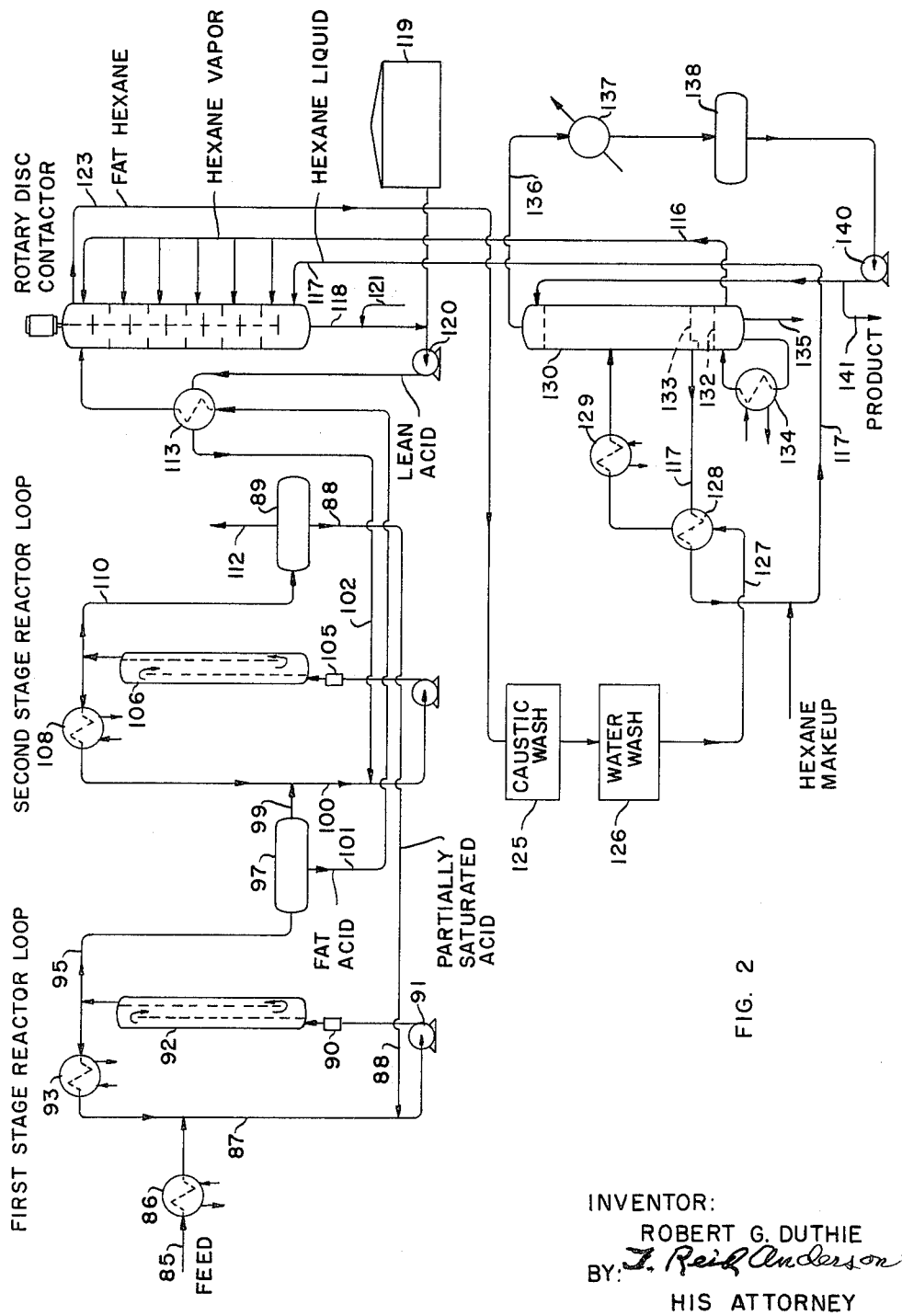

The process of the invention will be further illustrated with reference to the accompanying drawing, wherein:

FIG. 1 is a process flow diagram of a preferred embodiment of the process utilizing two countercurrent mixer-settler stages for both the absorption and reversion-stripping steps; and FIG. 2 is a second process flow diagram of another embodiment of the process wherein a rotary disc contactor is substituted for the mixers-settlers of the reversion-stripping step of FIG. 1.

In the system illustrated in FIG. 1, a catalytically cracked C$_5$ fraction containing 44.8% by weight tertiary amylenes flows in a line 10 to a feed precooler 11 where its temperature is lowered to approximateley 50° F. Beyond the feed precooler, the C$_5$ stream enters a first stage reactor loop 12. Immediately upon entering the reactor loop the C$_5$ stream is mixed with two streams of aqueous sulfuric acid. One sulfuric acid stream is provided by the recycle leg of the loop and the other stream is furnished by a line 14 which carries a sulfuric acid stream (partially saturated with tertiary amyl alcohol) from the bottom of a second stage separator hereinafter described. The acid used in the process has a concentration of about 65% H$_2$SO$_4$ and is employed in an aqueous acid-to-feed ratio of 1.3 lb./lb. for a feed containing typically 41% t-amylenes. The combined acid-hydrocarbon stream is forced under the pressure of a pump 16 through a jet mixer 18 disposed in the bottom of a first stage reactor vessel 19. The jet mixer, which is a mixing eductor, ensures an intimate mixing of the sulfuric acid and hydrocarbon phases. This thorough mixing promotes the mass transfer of the tertiary amylenes into the sulfuric acid phase where the tertiary amylenes on hydration reside as tertiary amyl alcohols. A portion of the mixed hydrocarbon-acid phases leaving the first stage reactor vessel is recycled via a line 21 to a first stage cooler 22 where its temperature is reduced to approximately 50° F. From the cooler the mixed phase flows in the loop to the juncture with the incoming C$_5$ feed stream, immediately preceding the pump 16. A residence time of approximately 15 minutes is generally suitable for the mixed hydrocarbon-sulfuric acid phases within the first stage reactor loop. From the reactor loop the mixed phase stream flows in a line 24 to a first stage settler 26. The residence time in this vessel is for example approximately 50 minutes.

The C$_5$ hydrocarbon phase separates from the underlying fat acid and is removed from an upper level of the separator via a line 28 to a second stage reactor loop 30. A lean sulfuric acid stream (free of t-amyl alcohol) is introduced via a line 32 to the now partially tertiary amylene-stripped C$_5$ hydrocarbon stream of line 28 at a point within the second stage reactor loop. The resulting acid-hydrocarbon stream is forced under the pressure of a pump 33 through a jet mixer of the type earlier described in connection with the first stage reactor loop. Here again the jet mixer is disposed at the bottom of a reactor vessel 13 and as in the first stage, the phase ratio of the feed is such that the hydrocarbon phase is continuous and the acid phase is dispersed. The volumetric ratio of the hydrocarbon to acid is about 1.8.

The residence time for the material flowing through this second stage reactor loop is again approximately 15 minutes. A portion of the combined stream leaving the top of the reactor vessel is recycled to a second stage cooler 33 where the temperature is lowered to approximately 50° and then moved in a recycle portion 35 of the reactor loop to combine with the incoming C$_5$ stream from the first stage. The intimately mixed hydrocarbon-aqueous sulfuric acid stream is removed from the reactor loop in a line 36 and passed to a second stage separator 15. From the separator the C$_5$ residual stream substantially stripped of its tertiary amylene content is removed in a line 37. The partially fat aqueous sulfuric acid containing considerable tertiary amyl alcohol leaves the bottom of the second stage separator in the aforementioned line 14 and is returned to the first stage reactor loop. Both the first and second stage separators are operated at a temperature of approximately 50° F. and each has a residence time of the order of 50 minutes.

A fat acid stream containing the recovered tertiary amylenes principally as alcohol is removed from the bottom of the first stage separator in a line 40 to a heat exchanger 41 where its temperature is raised to 110° F. in preparation for introduction to the first stage reversion loop. Immediately preceding entering of the reversion loop, the fat acid is blended with a hexane stream (partially fat in tertiary amylenes) flowing in a line 42 from a second stage reversion settler 38. In the reversion-stripping step, the fat acid is contacted with a hydrocarbon solvent (e.g., hexane) in a solvent to fat acid ratio of 1.0 lb./lb. The liquid circulating in this first stage reversion loop is maintained at a temperature of around 120° F. Here as in the instance of the reactor loops a jet mixer 43 disposed in the bottom of a reactor vessel 44 assures an intimate mixing of the hexane and fat sulfuric acid phases. It is critical to successful practice of the process that the time of contacting of the two phases at the elevated temperature of 120° F. be held to a minimum, otherwise, polymerization of the tertiary amylenes will occur to an objectionable extent. Accordingly, the residence time in this first stage reversion loop is held to approximately 2.3 minutes. Immediately upon leaving the first stage reversion loop, the combined hexane-sulfuric acid stream is cooled in a heat exchanger 46 to a temperature of about 100° F. The stream employed as a cooling medium is the partially stripped tertiary amylene containing acid from the first stage settler 48. From this heat exchanger 46 the combined hexane-sulfuric acid stream continues in a line 50 to a second heat exchanger where it is heat exchanged against the fat hexane stream 53 which is removed from an upper level of the first stage settler 48. The mixed phase stream 50 which is still at an elevated temperature, namely, of 80° F., passes to a cooler 52 where its temperature is lowered to about 50° F. and from there it flows to the first stage reversion separator 48.

The now partially stripped sulfuric acid of line 55 leaves the earlier mentioned heat exchanger 46 and is passed to a second stage reversion loop 57. A lean (olefin free) hexane stream enters this reversion loop via a line 59 at a point preceding a pump 60. The pump forces the combined hexane-sulfuric acid stream through a jet mixer 62 into the bottom section of a reversion reactor vessel 64. The residence time in this loop is approximately 2.7 minutes. The temperature of operation for the loop is approximately 120° F. From the reversion loop proper, the combined hexane-sulfuric acid stream passes to the earlier mentioned heat exchanger 41 where it is heat exchanged against the fat acid stream from the first stage separator of the first stage reactor loop. This heat exchange reduces the temperature of the combined stream to about 87° F. and it is next passed to a second stage reversion settler 38. The acid removed from the bottom level of this settler is substantially free of tertiary amylenes and is returned in a line 32 to the partially stripped hydrocarbon stream of the second stage reactor loop. A partially fat hexane solvent stream is removed from an upper level of the reversion settler 38 in a line 42 and is combined as earlier mentioned with the fat sulfuric acid phase from the first stage reactor at a point immediately preceding the first stage reversion loop.

The fat hexane solvent stream 53 from the first stage settler is moved to a caustic wash 70 and then to a water wash 71 and from the latter operation is passed through a line 72 to a feed bottoms exchanger 73 where the temperature of the fat hexane is raised to approximately 251° F. and then introduced to the central section of a solvent stripper 74. The tertiary amlyene product is removed overhead from the stripper via a line 75 and passed to a condenser 76 and to an accumulator 77. A portion of the condensed tertiary amylene is returned in a line 78 as reflux to the top of the stripper and the balance is removed as product through a line 79. The stripped hexane free of $C_5$ hydrocarbons is taken from the bottom of the stripper and recycled in line 59 to the process. A reboiler 80 provides a portion of the heat needed for the operation of the solvent stripper. Some liquid polymer will be made in the system and may be utilized as a portion of the solvent. Provision is made in a withdrawal line 81 for removing the circulating solvent from the system. Hexane make up is provided for in a line 82 opening into the lean solvent recycle line 59.

The process flow diagram of FIG. 2 differs principally from that illustrated in FIG. 1 in that the reversion step is achieved in a rotary disc contactor of the type generally illustrated in Reman U.S. 2,601,674. The adsorption of the tertiary amylenes is like that described in the process flow diagram of FIG. 1, with the $C_5$ fraction being contacted in two countercurrent stage extractions at a temperature of approximately 32° F. with 65% by weight sulfuric acid. The contact time of each stage is approximately 15 minutes and the aqueous acid to feed ratio is 1.4 lb./lb. with adsorption of 82% of the tertiary amylenes being achieved. The tertiary amylenes are present in the fat acid essentially as the amyl alcohol.

A catalytically cracked $C_5$ fraction containing 44% tertiary amylenes is passed in a line 85 to a feed precooler 86 where the temperature of the stream is adjusted to about 32° F. From the feed precooler the stream enters a first stage reactor loop 87 where it is mixed with the recycle stream of this first stage and with a partially fat sulfuric acid stream of line 88 from the bottom of a second stage separator 89 hereinafter described. The combined sulfuric acid hydrocarbon stream is forced through a jet mixer 90 under the pressure of a pump 91. The jet mixer accomplishes an intense and thorough mixing of the hydrocarbon and sulfuric acid phases. From the jet mixer the thoroughly agitated stream enters a first stage reactor vessel 92 which is baffled to provide a tortuous flow path. Out of the reactor vessel a portion of the stream is recycled to a first stage cooler 93 where the temperature of the stream is lowered. The rest of the combined hydrocarbon-acid stream leaving the reactor vessel is removed in a line 95 to a first stage separator 97. Here the partially stripped tertiary amylene hydrocarbon phase is removed in a line 99 and passed to a second stage reactor loop 100. A fat sulfuric acid stream containing the tertiary amylenes as tertiary amyl alcohol is removed from the bottom of the separator 97 via a line 101.

The partially stripped hydrocarbon stream entering the second stage reactor is mixed with recycle liquid and with lean (tertiary amylene-free) sulfuric acid provided by a line 102. The combined sulfuric acid-hydrocarbon stream is forced under the pressure of a pump 104 through a jet mixer 105. The jet mixer provides for an intimate mixing of the sulfuric acid and hydrocarbon phases and from the mixer the stream is passed to a second stage reactor vessel 106. Out of the reactor vessel a portion of the stream is recycled to the reactor loop which contains a second stage cooler 108. The cooler maintains the temperature of the recycled stream at approximately 32° F. The remainder of the stream out of the second stage reactor vessel is removed in a line 110 to the second stage separator 89. As earlier mentioned a partially fat sulfuric acid stream is removed from the bottom of this separator and passed via the line 88 to the first stage reactor loop. The $C_5$-hydrocarbon fraction substantially stripped of tertiary amylenes leaves the second stage separator in a line 112.

The fat acid stream of line 101 is passed to a lean acid-fat acid heat exchanger where its temperature is raised to approximately 93° F. From there the fat acid stream is introduced to a top section of a rotary disc contactor. The rotary disc contactor is a commercially available liquid-liquid extraction apparatus. Reversion is carried out in the rotary disc contactor by contacting the fat acid at a temperature of approximately 120° F. with a hexane solvent. The contact is by four stages in mixed cross and counter flows. The partial cross flow pattern is accomplished by supplying the heat of reversion (18,000 B.t.u./lb. mole) by means of a hexane vapor sparge supplied at six spaced points along the length of the rotary disc contactor by six branched lines of a vapor line 116. This vapor sparge is distributed along the contactor to maintain the uniform temperature of 120° F. A liquid hexane stream is supplied to the lower end of the rotary disc contactor at a temperature of 120° F. via a line 117. The lean acid stripped free of tertiary amyl alcohol is removed from the base of the rotary disc contactor in a line 118 and passed to storage 119 and to a pump 120. From the pump 120 the lean acid is moved to the earlier mentioned lean acid-fat acid heat exchanger 113. Make up concentrated sulfuric is supplied to the system via a line 121.

The reversion in the rotary disc contactor is carried to approximately 95% of complete extraction. The fat hexane contains 24% by weight of tertiary amylene and the lean acid retains approximately 1.5% by weight of amyl alcohol. The fat hexane stream is removed in a line 123 to a caustic wash 125 and following that to a water wash 126. Out of the water wash the fat hexane stream is passed in a line 127 to a feed bottoms heat exchanger 128. From the latter heat exchanger it is then passed to a feed preheater 129 and then introduced to a central section of a hexane stripper 130. The hexane stripper is operated with a bottoms temperature of approximately 320° F. and a pressure of 20 p.s.i.g. The hexane vapor stream for injection into the rotary disc contactor is taken from the column below a bottom tray 132. The lean hexane liquid recycle stream is removed from the column from a trap-out tray 133 in the earlier mentioned line 117. The temperature of this latter stream is reduced from 220° F. to 120° F. by its passage through the feed bottoms exchanger 128.

A polymer which consists of a mixture of amylene dimer and diamyl ether and higher polymers is concentrated in the reboiler 134. Sufficient hexane is maintained in the reboiler and column bottoms to maintain the reboiler temperature at the desired temperature of 320° F. The polymer concentrate is taken from the hexane stripper in a bottoms line 135. The tertiary amylene product with a purity of approximately 99% is removed in an overhead stream via a line 136 from the top of the hexane stripper to a condenser 137 and an accumulator 138. A portion of the tertiary amylene product is returned by a pump 140 as reflux to the hexane stripper and the rest is removed as product in a line 141.

I claim as my invention:

1. Process for separating and concentrating tertiary amylenes from a hydrocarbon feed stream containing said amylenes and other close-boiling $C_5$ hydrocarbons including normal amylenes comprising (1) contacting said feed stream with aqueous sulfuric acid of from about 63 to 68% acid concentration at a temperature of from about 14° F. to about 68° F.

to extract selectively tertiary amylenes to the substantial exclusion of normal amylenes to obtain a fat sulfuric acid containing tertiary amyl alcohol,
(2) separating said fat sulfuric acid from the remaining unextracted hydrocarbons,
(3) intimately contacting the fat sulfuric acid at a temperature of from about 104° F. to about 120° F. with an inert liquid hydrocarbon stream to obtain an inert liquid hydrocarbon phase enriched in tertiary amylenes and a sulfuric acid phase of reduced tertiary amyl alcohol content, said contacting being of a time interval of less than five minutes to avoid excessive polymerization of the tertiary amylenes and with said inert liquid hydrocarbon having a difference in boiling point from that of the tertiary amylenes sufficient to permit ready distillation of the tertiary amylenes therefrom,
(4) separating said sulfuric acid phase from said inert liquid hydrocarbon phase, and
(5) recovering a tertiary amylene product from the tertiary amylene-enriched inert liquid hydrocarbon by distillation.

2. Process in accordance with claim 1, wherein the fat sulfuric acid and inert liquid hydrocarbon are contacted in step (3) at a temperature of about 120° F.

3. Process in accordance with claim 1, wherein the resulting mixture of inert liquid hydrocarbon phase enriched in tertiary amylenes and the sulfuric acid phase of reduced tertiary alcohol contacted in step (3) is cooled to a temperature below 85° F. prior to their separation in step (4).

4. Process in accordance with claim 1, wherein there is formed a small amount of a liquid polymer from the tertiary amylene and wherein said polymer is utilized at least in part as the inert liquid hydrocarbon stream in step (3).

5. Process in accordance with claim 1, wherein the time of said contacting in step (3) is within the range of from 1 to about 3 minutes.

References Cited by the Examiner
UNITED STATES PATENTS

| | | | |
|---|---|---|---|
| 2,407,386 | 9/1946 | Scheeline | 260—677 |
| 2,443,245 | 6/1948 | Hibshman | 260—677 |
| 2,530,332 | 11/1950 | Hudson | 260—677 |
| 2,560,362 | 7/1951 | Morrell et al. | 260—677 |
| 2,756,266 | 7/1956 | Francis | 260—681.5 |
| 2,958,715 | 11/1960 | Sanford et al. | 260—677 |

ALPHONSO D. SULLIVAN, *Primary Examiner.*
ALLAN M. BOETTCHER, MILTON STERMAN,
*Examiners.*
S. H. BLECH, P. M. COUGHLAN, D. S. ABRAMS,
*Assistant Examiners.*